United States Patent

[11] 3,611,898

| [72] | Inventor | Nobunao Mikami<br>Kawasaki-shi, Japan |
|---|---|---|
| [21] | Appl. No. | 767,544 |
| [22] | Filed | Sept. 5, 1968 |
| [45] | Patented | Oct. 12, 1971 |
| [73] | Assignee | Kabushiki Kaisha Ricoh<br>Tokyo, Japan |
| [32] | Priority | Sept. 11, 1967 |
| [33] | | Japan |
| [31] | | 42/58,219 |

[54] MULTIPHOTOGRAPHING DEVICE
1 Claim, 3 Drawing Figs.

| [52] | U.S. Cl. | 95/18 R, 95/1 |
|---|---|---|
| [51] | Int. Cl. | G03b 41/00 |
| [50] | Field of Search | 95/18 P; 355/33 |

[56] References Cited
UNITED STATES PATENTS

| 2,950,644 | 8/1960 | Land et al. | 95/18 P |
|---|---|---|---|
| 3,225,672 | 12/1965 | Clay | 95/18 P |
| 1,921,258 | 8/1933 | Nordmann | 355/33 X |

*Primary Examiner*—John M. Horan
*Assistant Examiner*—T. A. Mauro
*Attorney*—Burgess, Ryan & Hicks ABSTRACT: A first lens directed toward multiple objects a relatively simple cemented lens group and a second lens comprising a group of microlenses which are arrayed so as to either have a curvature corresponding to that of an image focused through said first lens or to each have a focal length different from each other, for example those microlenses at the periphery of the second lens having focal lengths different from those of the microlenses at the center portion of the second lens, so as to correspond with the curvature of the image focused through the first lens.

INVENTOR

NOBUNAO MIKAMI

BY Burgess, Ryan + Hicks

ATTORNEY

MULTIPHOTOGRAPHING DEVICE

BACKGROUND OF THE INVENTION

The present invention relates to a multiphotographing device and more particularly a multiphotographing device in which an image of one object is split finely into a plurality of infinitesimal portions or images which in turn are recorded upon a sensitive material at predetermined portions thereof as finely split images. In a similar manner as described above an image of another object is split finely into a plurality of infinitesimal portions or images which in turn are recorded upon the same sensitive material at predetermined portions thereof as finely split images and so on.

As shown in FIG. 1, the optical system of the multiphotographing device of the prior art comprises a relatively large first lens 1, a second lens 2 and an aperture 3 disposed immediately behind the first lens. The second lens 2 is comprised of a plurality of microlenses which are integrally arranged and disposed so as to form a lattice consisting of rows and columns of the microlens. The second lens serves to split the inverted image produced by the first lens into a plurality of images and to focus upon a photosensitive material 4 the real not-inverted split images thereof. The aperture 3 is so arranged and disposed that the aperture 3 can move vertically and transversely in the plane which is substantially perpendicular with respect to the optical axis O of the first lens. Thus, the aperture 3 cooperates with each microlens of second lens 2 to focus upon a specified portion of the sensitive material 4 each of the infinitesimal portions of the image produced by the first lens.

The same effect can be also attained when the aperture 3 is arranged and disposed immediately before or within the first lens 1. Furthermore, the sensitive material arranged and disposed backwardly of the second lens 2 may be alternatively disposed at the back surface of the second lens if the back surface is the focal plane of the second lens. Alternatively, the sensitive material 4 may be spaced apart from the second lens 2 by a suitable distance.

When an inverted image A of an object is focused by the first lens between the first lens 1 and the second lens 2, a split portion $Aa$ of the image A whose light rays are made incident upon one microlens element $2a$ of the second lens 2 is focused as not-inverted image $Aaa$ upon the sensitive material 4. In a similar manner, the light rays including another portion $An$ of the image A through the aperture 3 are made incident upon another microlens element $2n$ of the second lens 2 so as to focus upon the sensitive material a split image $Ana$.

When the aperture 3 is displaced to the position indicated by $3a$ and when the first lens 1 is directed toward another object, the image of this other object can be produced as shown by reference numeral B. One portion $Ba$ of the image B included in the light rays coming from the aperture $3a$ is focused as not-inverted real image $Baa$ upon the sensitive material 4 through the above-described microlens element $2a$ of the second lens 2. In a similar manner, another portion $Bn$ of the image B included in the light rays coming from the aperture $3a$ and being made incident upon the above-described microlens element $2n$ is focused as not-inverted real image $Bna$ upon the sensitive material 4.

Furthermore, when the aperture is displaced to a intermediate position between the positions 3 and $3a$, the split images of an image produced are focused upon the not-exposed portion of the sensitive material, that is the intermediate portion between the portions of the sensitive material which have been already exposed by the light rays coming through the aperture positions 3 and $3a$. When the aperture is displaced every time a photography is made, it is required that the position to which the aperture is displaced is not superposed to the position at which the aperture has already located once.

In the photographing device of the type described above, the number of pictures to be photographed is determined by the ratio of the total exposure area when the shield plate having the aperture is removed to the exposure area of the aperture. That is, the number of pictures to be photographed upon a single sensitive material can be determined by the ratio of the effective area of the first lens located at the position of the aperture to the effective area of the aperture. Assuming that the effective diameter of the first lens at the position of the aperture be 30 mm. and its focal length 95 mm., the distance between the aperture and the image focused by the first lens be 80 mm., the distance between the aperture and the second lens be 40 mm., the aperture be 2 mm. × 2 mm., and the displacement pitch both in the vertical and transverse directions be 3 mm., then 49 pictures can be photographed by displacing the aperture in seven steps in either directions.

The images of the objects obtained by the multiphotographing device of the type described above are distributed over only one sensitive material in the form of finely split forms, so that it is impossible to see what kind of objects are recorded thereupon.

The recorded images can be reproduced with the image reproduction optical system similar to the system of the multiphotographing device by reversing the light rays in direction.

The first lens which determines the direction of the light path depending upon the position of the aperture must be made sufficiently large enough to includes all the range through which the aperture moves vertically and transversely. Therefore, when the first lens is comprised of a better quality lens whose aberration is sufficiently corrected, the multiphotographing device becomes larger in size and increases its weight.

SUMMARY OF THE INVENTION

According to the present invention, a first lens comprises a relatively simple cemented lens consisting of simple lenses and a second lens consisting of a group of microlenses which are arrayed so as to have a curvature corresponding to that of an image focused through said first lens or each of which has a focal length different from each other, for example those microlenses at the periphery of the second lens having focal lengths different from those of the microlenses at the center portion of the second lens, so as to correspond with the curvature of the image focused through the first lens.

As described hereinabove, in order to attain one of the objects of the present invention, the first lens is comprised of a cemented lens having a relatively simple construction. When such a simple first lens as described above is used as an objective directed toward an object to be photographed, the image focused by this first lens is bent or curved. Therefore, in order to focus this image again upon a geometrically curved surface through a group of microlens elements, a suitable means for correcting the curvature of the image must be provided. As a means for correcting such curvature of the image, according to one embodiment of the present invention, a second lens is utilized which is curved or bent according to the curvature of the image. In this embodiment, the curvature of the second lens is substantially the same with that of the image so that the distances between the image and every point of the second lens along the axes substantially parallel with the optical axis of the first lens are substantially the same, and the split inverted images through the microlenses of the second lens can be focused upon a sensitive material disposed upon the back surface of the second lens.

According to a second embodiment of the present invention, the focal lengths of microlenses of the second lens are made different from each other so as to correspond to the curvature of the image focused through the first lens. For example, the focal lengths of the microlenses located at the periphery of the second lens are different from those of the microlenses located at the center portion of the second lens. The distance from the center of the image which is curved to the microlens located at the center portion of the second lens is shorter than that between the portion remote from the center of the image focused through the first lens and the microlens located at the periphery of the second lens so that the focal lengths of the microlens located at the center portion of the second lens must be also shorter than that of the microlens located at the periphery of the second lens in order that the curved image focused through the first lens can be sharply focused upon the planar sensitive material. That is, it is preferable that the focal lengths of the microlenses become longer as the distances of their locations from the center of the second lens are increased toward the periphery of the second lens. It is not necessary in practice, however, to vary all of the focal lengths of the microlenses constituting the second lens. That is, the microlenses constituting the second lens may be divided into a certain number of groups from the center portion toward the peripheral portion of the second lens in such a manner that the focal lengths of the microlenses belonging to the same group thus divided are made same, but different from those of the adjacent groups.

When the curved image focused through the first lens is suitable corrected and focused through the second lens whose construction has been described hereinabove, then a relatively simple structural first lens can be utilized.

Therefore, one of the objects of the present invention is to provide a multiphotographing device compact in size and light in weight.

Another object of the present invention is to provide a multiphotographing device which can be manufactured at inexpensive cost.

The above and other objects and advantages of the present invention will become apparent from the following description when read in the light of the accompanying drawings.

DESCRIPTION OF THE PREFERRED EMBODIMENTS

Figure 1:
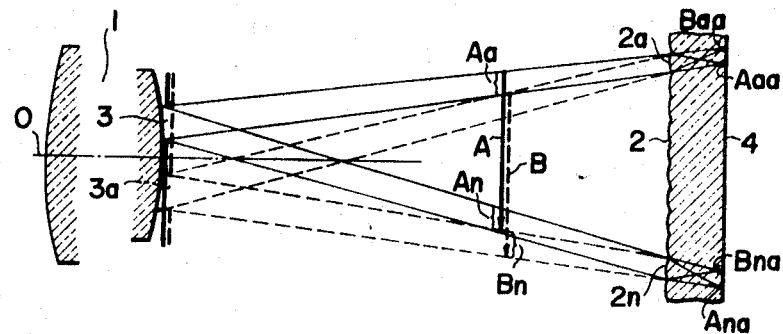
FIG. 1 is an explanatory view of a conventional multiphotographing device.
Figure 2:
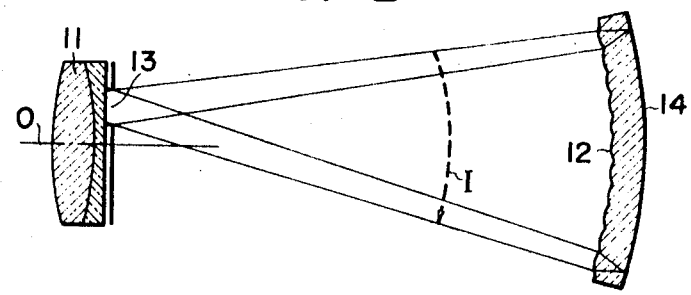
FIG. 2 is an explanatory view of one embodiment of the present invention.

In FIG. 2 illustrating one embodiment of a present invention, reference numeral 11 designates a first lens having a relatively simple construction; 13, a movable aperture; I, an image which is produced by the first lens and whose focal plane is curved or bent; and 12, a second lens consisting of a group of microlenses each of which is considerably smaller than the first lens.

The second lens 12 is bent or curved in the same direction and with the same curvature as that of the image I and the distances between the image I and every point of the second lens 12 along the axes parallel to the optical axis of the first lens are substantially the same.

The split images of the image I split by the microlenses of the second lens 12 are focused upon a sensitive material 14 disposed upon the back surface of the second lens.

Figure 3:
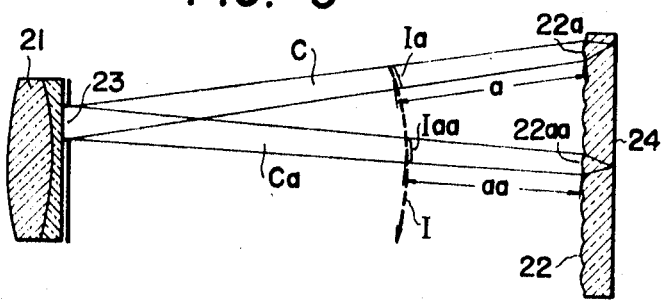
FIG. 3 is an explanatory view of the second embodiment of the present invention.

Now with reference to FIG. 3 illustrating the second embodiment of the present invention, reference numeral 21 designates a first lens having a relatively simple construction; 23, a movable aperture; I, an image which is produced by the first lens and whose focal plane is also curved or bent; and 22, a second lens consisting of a group of microlenses each of which is considerably smaller than the first lens 21.

The bundles C and Ca of light rays emerge through the aperture 23 and are made incident upon the microlens 22a located at the periphery of the second lens 22 and upon the microlens 22aa located at the center portion of the second lens 22 respectively. It will be understood that the distances $a$ and $aa$ between the infinitesimal images $Ia$ and $Iaa$ included in the bundles C and Ca of light rays respectively and their corresponding microlenses 22a and 22aa are different from each other depending upon the curvature or bending of the focal plane of the image I, that is, the distance $a$ is longer than the distance $aa$.

Since the image I is an object to be focused by each of the microlens elements constituting the second lens 2, the focal length of each of the microlens elements may be determined respectively so as to be best suited for the distance between each of the microlens elements and its corresponding infinitesimal portion of the image I that is the photographing range in order that the infinitesimal portions of the image I may be focused sharply upon the sensitive material 24 which is spaced apart from all of the microlens elements by the same distance.

In view of the above, the focal length of the microlens 22a is determined so as to best correspond with the photographing range $a$ of the microlens 22a while the focal length of the microlens 22aa is determined so as to best correspond with the photographing range of the microlens 22aa. In the similar manner as described above, all of the focal lengths of the microlens elements constituting the second lens 22 are determined to the lengths best suited for the photographing ranges of the microlens elements respectively. Therefore every infinitesimal portions of the image I can be sharply focused upon the sensitive material 14 through their corresponding microlenses.

The invention has been described in detail with particular reference to two embodiments of the present invention, but it will be understood that variations and modifications can be effected within the spirit and scope of the invention as described hereinabove as defined in the appended claims.

1. A multiphotographing device comprising:
a first lens having a optical axis and adapted to form an inverted image;
a second lens spaced from said first lens and adapted to reinvert the image, said second lens having an inside surface facing said first lens and an outside surface remote from said lens;
an aperture associated with said first lens and closely spaced thereto between said first and second lenses, said aperture being movable in a plane perpendicular to the optical axis of said first lens;
a photosensitive material associated with said second lens and closely located with respect to the outside surface of said second lens;
said first lens of a type to create said image in curved form between said first and second lenses;
said second lens comprising a plurality of microlenses arranged substantially in a plane parallel to said plane in which said aperture moves;
said photosensitive material being located substantially in said plane;
each said microlens adapted to split the image into a finely divided portion thereof; and
said plurality of microlenses being divided into groups with the focal length of the microlenses in an individual group being the same, and the group furthest from the optical axis having the longest focal lengths so as to sharply focus the split images on said photosensitive material.